(12) United States Patent
Takahashi et al.

(10) Patent No.: US 7,623,339 B2
(45) Date of Patent: Nov. 24, 2009

(54) ELECTROCHEMICAL DEVICE

(75) Inventors: Tetsuya Takahashi, Tokyo (JP); Yousuke Miyaki, Tokyo (JP); Atsuko Kosuda, Tokyo (JP)

(73) Assignee: TDK Corporation, Tokyo (JP)

( * ) Notice: Subject to any disclaimer, the term of this patent is extended or adjusted under 35 U.S.C. 154(b) by 757 days.

(21) Appl. No.: 11/316,909

(22) Filed: Dec. 27, 2005

(65) Prior Publication Data

US 2006/0166092 A1   Jul. 27, 2006

(30) Foreign Application Priority Data

Dec. 28, 2004   (JP)   ............ P2004-380190

(51) Int. Cl.
*H01G 9/00*   (2006.01)

(52) U.S. Cl. ............ 361/502; 361/503; 361/504; 361/506; 361/512; 361/523

(58) Field of Classification Search ........... 361/502, 361/503–504, 508–512, 516–519, 523–525
See application file for complete search history.

(56) References Cited

U.S. PATENT DOCUMENTS

| | | | | |
|---|---|---|---|---|
| 4,488,203 A | * | 12/1984 | Muranaka et al. | 361/502 |
| 5,072,335 A | * | 12/1991 | Kurabayashi et al. | 361/502 |
| 6,097,587 A | * | 8/2000 | Inagawa et al. | 361/502 |
| 6,275,371 B1 | * | 8/2001 | Yoshio et al. | 361/502 |
| 6,349,027 B1 | * | 2/2002 | Suhara et al. | 361/502 |
| 6,426,865 B2 | * | 7/2002 | Kasahara et al. | 361/512 |
| 6,751,084 B2 | | 6/2004 | Nakazawa et al. | |
| 6,882,517 B2 | * | 4/2005 | Tano et al. | 361/502 |
| 7,068,494 B2 | * | 6/2006 | Fujino | 361/502 |
| 2003/0081372 A1 | | 5/2003 | Nakazawa et al. | |

FOREIGN PATENT DOCUMENTS

| | | |
|---|---|---|
| JP | A-05-283287 | 10/1993 |
| JP | A-11-317332 | 11/1999 |
| JP | A-2004-253562 | 9/2004 |
| KR | 2003-0035904 | 5/2003 |

* cited by examiner

*Primary Examiner*—Nguyen T Ha
(74) *Attorney, Agent, or Firm*—Oliff & Berridge, PLC

(57) ABSTRACT

An electrical double layer capacitor comprises an element and a case which houses the element. The element has an anode charge collector, anode, separator, cathode and cathode charge collector. The anode and cathode consist of a porous layer containing electrically conducting porous particles as a constituent material. The anode charge collector is disposed in electrical contact with the anode. The cathode charge collector is disposed in electrical contact with the cathode. The thickness of the element is 600 μm or less. The sum of the anode thickness and cathode thickness is set to 80% or less of the thickness of the element.

8 Claims, 9 Drawing Sheets

Fig.6
(a)
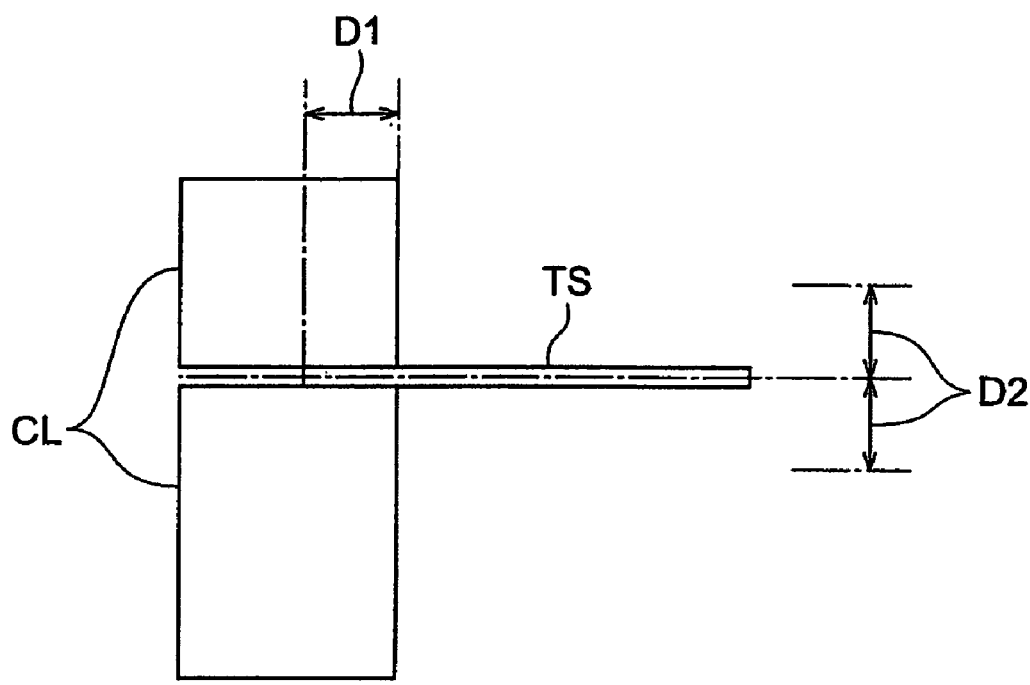
(b)
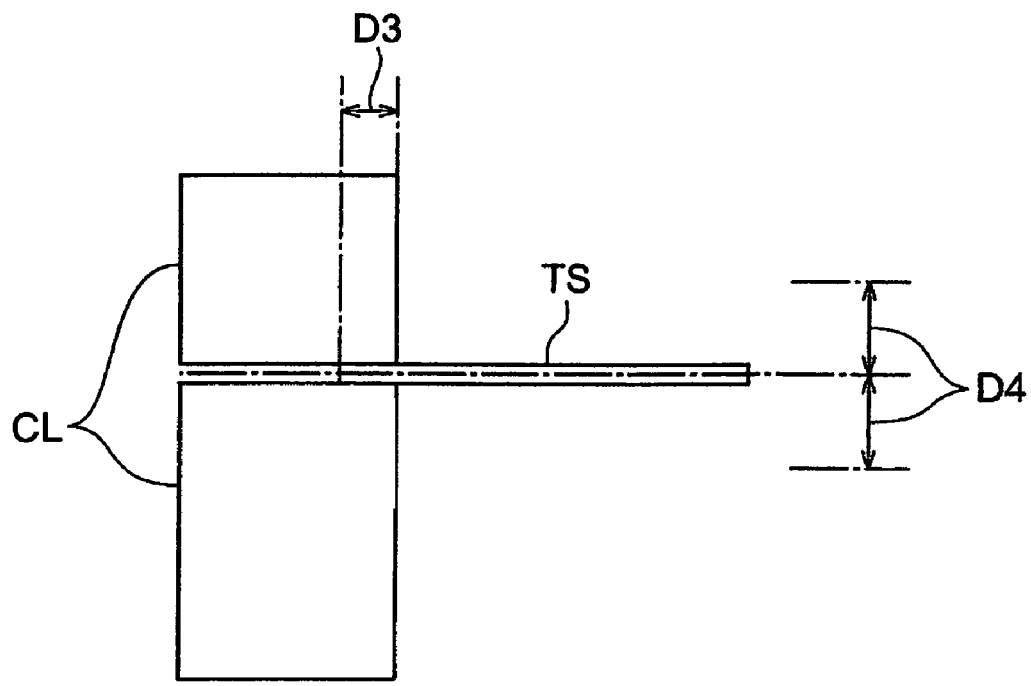

Fig.7

|  |  | Capacity (mF) | |
|---|---|---|---|
|  |  | Before bending test | After bending test |
| Example 1 | No. 1 | 25.4 | 25.1 |
|  | No. 2 | 25.1 | 25.3 |
|  | No. 3 | 24.5 | 24.8 |
|  | No. 4 | 25.4 | 25.4 |
|  | No. 5 | 25.1 | 24.7 |
| Example 2 | No. 1 | 99.8 | 100.0 |
|  | No. 2 | 99.9 | 99.5 |
|  | No. 3 | 99.5 | 99.4 |
|  | No. 4 | 99.1 | 99.4 |
|  | No. 5 | 99.1 | 99.4 |
| Example 3 | No. 1 | 4.8 | 4.9 |
|  | No. 2 | 6.0 | 6.2 |
|  | No. 3 | 6.2 | 6.2 |
|  | No. 4 | 5.3 | 4.9 |
|  | No. 5 | 4.3 | 4.4 |
| Example 4 | No. 1 | 25.6 | 25.7 |
|  | No. 2 | 25.1 | 25.2 |
|  | No. 3 | 25.5 | 25.0 |
|  | No. 4 | 25.5 | 25.2 |
|  | No. 5 | 25.2 | 25.0 |
| Example 5 | No. 1 | 81.8 | 81.8 |
|  | No. 2 | 81.4 | 81.3 |
|  | No. 3 | 82.0 | 82.2 |
|  | No. 4 | 81.1 | 81.1 |
|  | No. 5 | 81.1 | 81.3 |
| Comparative Example 1 | No. 1 | 150.0 | 150.0 |
|  | No. 2 | 149.8 | Cannot be measured |
|  | No. 3 | 149.6 | 134.6 |
|  | No. 4 | 150.5 | 150.1 |
|  | No. 5 | 150.2 | Cannot be measured |
| Comparative Example 2 | No. 1 | 201.4 | Cannot be measured |
|  | No. 2 | 201.2 | Cannot be measured |
|  | No. 3 | 201.5 | Cannot be measured |
|  | No. 4 | 201.0 | Cannot be measured |
|  | No. 5 | 201.4 | 192.1 |
| Comparative Example 3 | No. 1 | 1.2 | 0.9 |
|  | No. 2 | 2.1 | 1.8 |
|  | No. 3 | 0.9 | 1.1 |
|  | No. 4 | 1.1 | 1.3 |
|  | No. 5 | 1.5 | 1.3 |

*Fig.9*

|  | Element thickness (μm) | Deformation amount (mm) |
|---|---|---|
| Example 6 | 577 | 1.2 |
| Example 7 | 257 | 3.1 |
| Example 8 | 77 | 5.6 |
| Comparative Example 4 | 757 | 0.3 | ns
ELECTROCHEMICAL DEVICE

BACKGROUND OF THE INVENTION

1. Field of the Invention

This invention relates to an electrochemical device.

2. Background of the Related Art

Eelectrochemical devices such as electrochemical capacitors including electrical double layer capacitors, and secondary cells including lithium ion secondary batteries, permit easy miniaturization and weight saving and are therefore expected to be useful as power supplies, for example as power supplies for small electronic instruments or backup power supplies, or as auxiliary power supplies for electric vehicles or hybrid cars.

As an example of such an electrochemical device, an assembly having first and second electrodes and a separator which separates the first and second electrodes, is known (see JP-A No. 5-283287). In the electrochemical capacitor disclosed in JP-A No. 5-283287, the first and second electrodes comprise a conducting active substance layer containing an electrode active substance as constituent material, and an electrically conducting charge collector disposed in electrical contact with the electrically conducting active substance layer.

SUMMARY OF THE INVENTION

It is therefore an object of this invention to provide an electrochemical device which can be made much thinner while still ensuring good electrical properties.

In recent years, as the use of portable electronic equipment is becoming more widespread, it is strongly desired that such devices will become more miniature and lightweight. To make these devices more compact and lightweight, it is also desired that the electrochemical devices installed in these electronic instruments become thinner. The Inventor therefore carried out research aimed at making electrochemical devices much thinner, and discovered the following new facts.

If an electrochemical device becomes thinner, it is more easily bent. In such a thin electrochemical device, when the electrochemical device is bent, there is a risk that chips or cracks may occur in the active substance layer. If chips and cracks occur in the active substance layer, the electrical properties of the electrochemical device will decline. In particular, if the active substance layer becomes chipped, fragments of the active substance layer may penetrate the separator so that the first electrode and second electrode are short-circuited, and there is even a risk that the electrochemical device will stop functioning altogether.

The Inventor carried out detailed studies on electrochemical devices which also offer good electrical properties. As a result, the Inventor also discovered the new fact that when the thickness of the active substance layer increased, chips and cracks easily occurred in the active substance layer.

Based on these research results, the electrochemical device according to this invention comprises an element comprising first and second electrodes, and a separator separating the first and second electrodes, wherein the first and second electrodes comprise an electrically conducting active substance layer containing an electrically conducting substance as a constituent material, and an electrically conducting charge collector assembly disposed in electrical contact with the active substance layer, wherein the element thickness is set to 600 µm or less, and the total thickness of the active substance layer contained in the first and second electrodes is set to 80% or less of the element thickness.

In the electrochemical device according to this invention, since the element thickness is set to 600 µm or less; the electrochemical device can be made much thinner. If the element thickness is set to 600 µm or less, the element is easily bent. However, since the total thickness of the active substance layers in the first and second electrodes is set to 80% or less of the element thickness, the occurrence of chips and cracks in the active substance layer is suppressed, and as a result, good electrical characteristics can be ensured.

The total thickness of the active substance layers in the first and second electrodes is preferably 10% or more of the element thickness. If the total thickness of the active substance layers in the first and second electrodes is less than 10% of the element thickness, the active substance layer is too thin, it is difficult to manufacture a uniform active substance layer and there is a risk that electrical properties will decline. Hence, by setting the total thickness of the active substance layers in the first and second electrodes to 10% or more of the element thickness, good electrical properties can be better ensured.

According to this invention, a much thinner electrochemical device which still maintains good electrical properties, can be obtained.

BRIEF DESCRIPTION OF THE DRAWINGS

FIG. 6 is a schematic diagram for describing a bending test

FIG. 7 is a chart showing measurement results for capacity in Examples 1-5 and Comparative Examples 1-3 before and after bending.

FIG. 9 is a chart showing the result of measuring the deformation amount of the electrical double layer capacitor.

DESCRIPTION OF THE PREFERRED EMBODIMENTS

Hereafter, a preferred embodiment of this invention will be described in detail referring to the accompanying drawings. In the description, components which have identical functions are assigned identical symbols, and their description is not repeated.

Figure 1:
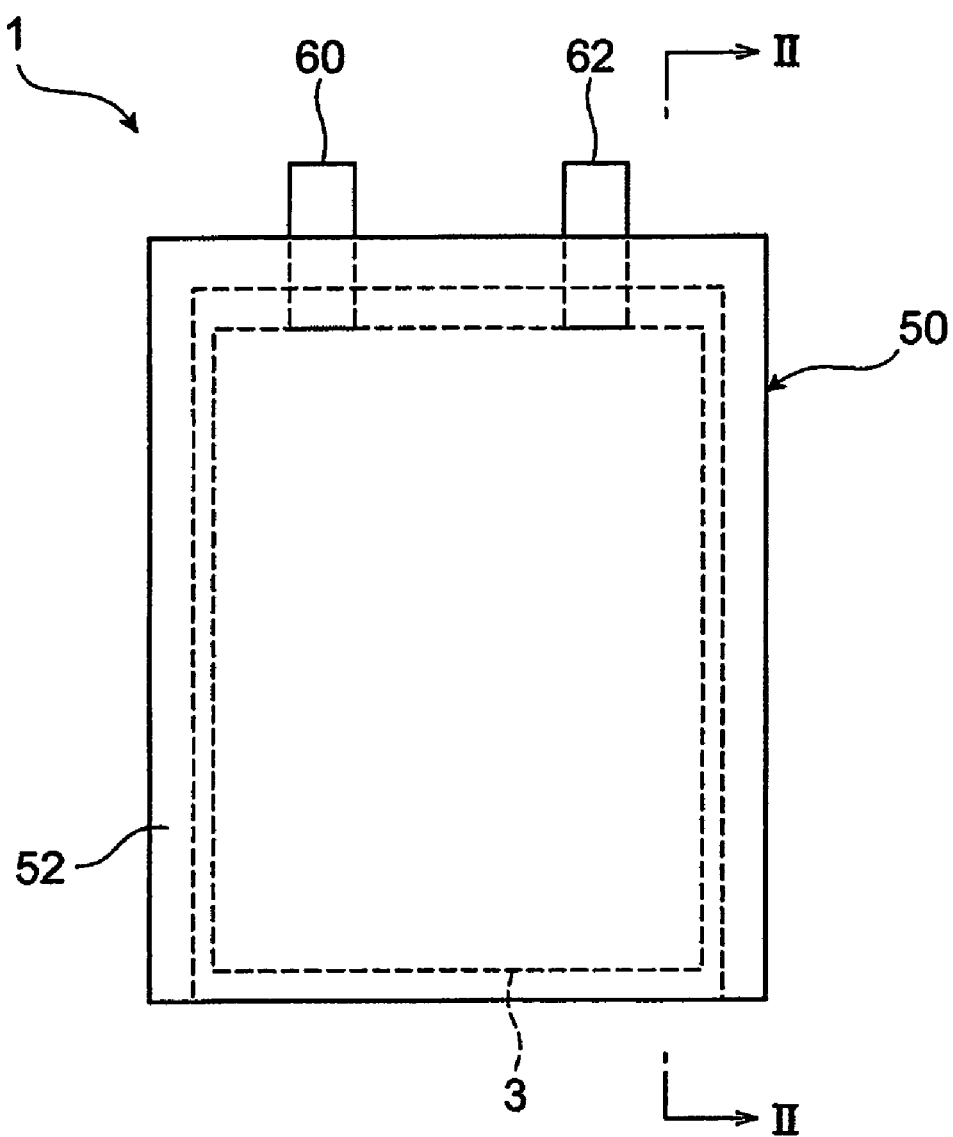
FIG. 1 is a schematic plan view showing an electrical double layer capacitor according to this example.
Figure 2:
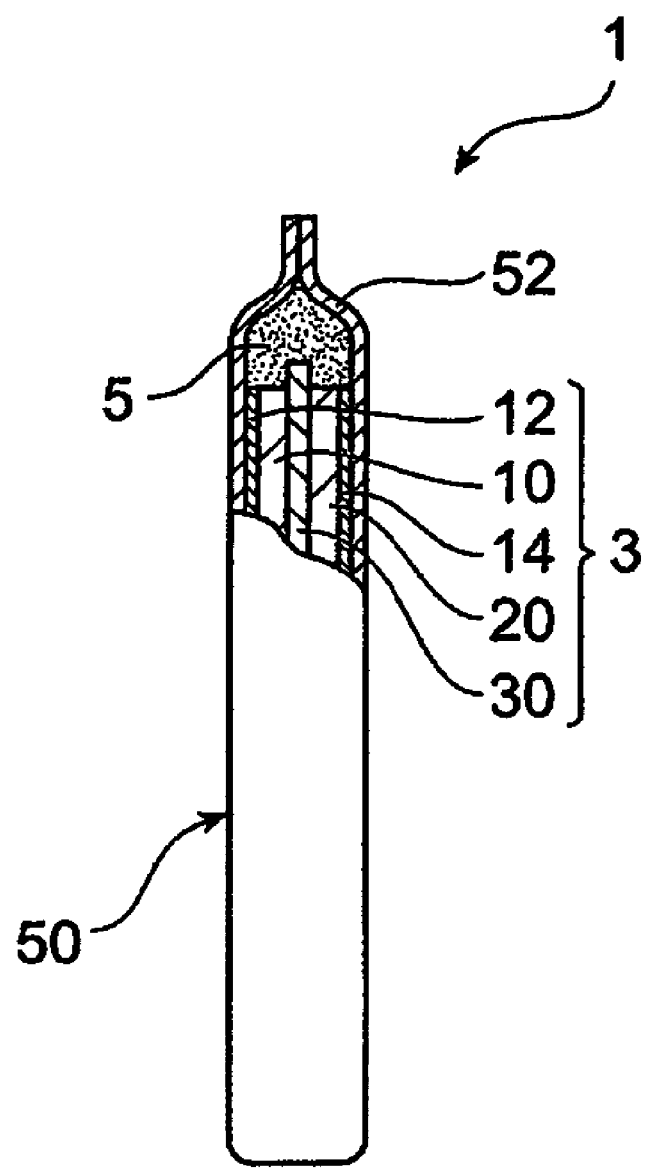
FIG. 2 is a schematic diagram showing a cross-sectional structure along a line II-II in FIG. 1.
Figure 3:
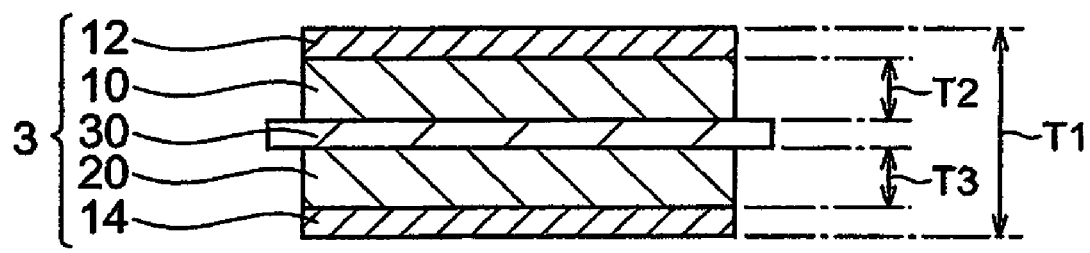
FIG. 3 is a schematic diagram showing the cross-sectional structure of an element in the electrical double layer capacitor according to this example.

First, referring to FIGS. 1-3, the construction of an electrical double layer capacitor 1 relating to this embodiment will be described. FIG. 1 is a schematic plan view showing the electrical double layer capacitor relating to this embodiment. FIG. 2 is a schematic diagram showing the cross-sectional construction along a line II-II in FIG. 1. FIG. 3 is a schematic diagram showing the cross-sectional construction of an element in the electrical double layer capacitor relating to this embodiment. In this embodiment, the invention is applied to the electrical double layer capacitor.

The electrical double layer capacitor 1, as shown in FIGS. 1 and 2, comprises an element 3, and a case 50 which houses the element 3. The element 3, as shown in FIG. 3, comprises an anode charge collector 12, anode 10, separator 30, cathode 20 and cathode charge collector 14. The element 3 is formed by laminating the anode charge collector 12, anode 10, separator 30, cathode 20 and cathode charge collector 14. A liquid electrolyte (not shown) is contained in the anode 10, cathode 20 and separator 30. This electrolyte is in contact with the anode 10, cathode 20 and separator 30.

For convenience of description, the polarity of the "anode" and "cathode" used in this specification are determined based on the polarity when the electrical double layer capacitor 1 discharges.

The anode 10 and cathode 20 consist of porous layers (active substance layers) containing electrically conducting porous particles (electrode active substance) as a constituent material. The constituent material of the porous layer is not particularly limited, and may be an identical substance to that used for the porous layer forming polarizable electrodes, such as the carbon electrodes used in the electrical double layer capacitor known in the art For example, the carbon material (e.g., activated carbon) obtained by activation treatment of coking coal (e.g., petroleum coke manufactured by a delayed coker which uses the bottom oil of the fluid cat-cracker of petroleum heavy oil, or the residual oil of a vacuum distillation apparatus, as stock oil), as the main component of the constituent material, can be used. Other conditions (type and content of constituent materials other than carbon materials, such as a binder) are not particularly limited. For example, electrically conducting agents (carbon black, etc.) for imparting conductivity to the carbon powder and thermoplastic resins (polyvinylidene fluoroethylene (PVDF), etc.) used as binders, may be added.

As the aforesaid electrically conducting agent, in addition to carbon black, powdered graphite can be used. As the aforesaid binder, in addition to PVDF, PTFE, PE, PP or fluororubber can be used.

The anode charge collector 12 is disposed in electrical contact with the anode 10. The cathode charge collector 14 is disposed in electrical contact with the cathode 20. The anode charge collector 12 and cathode charge collector 14 are not particularly limited provided that they are good conductors which can allow full migration of electrical charge to the anode 10 and cathode 20, and the charge collectors used in electrical double layer capacitors known in the art may also be used here. For example, metal foil such as aluminum or the like may be mentioned, and metal foils which have been etched or rolled can also be used without limitation.

The separator 30 disposed between the anode 10 and cathode 20 is not particularly limited provided that it is formed from an insulating porous material, and the separators used in electrical double layer capacitors may also be used here. Examples of this insulating porous material are a laminate of resin films such as polyethylene, polypropylene or polyolefine, extension films of composites of the aforesaid resins, or a fibrous nonwoven fabric comprising at least one constituent material selected from a group comprising cellulose, polyester and polypropylene.

The lateral ends of the anode charge collector 12, anode 10, cathode 20 and cathode charge collector 14, respectively, are preferably formed so that they are aligned with each other in the same vertical planes. They are preferably also formed so that the lateral ends of the separator 30 project outside further than these planes.

An electrolytic solution (not shown) is contained in the anode 10, cathode 20 and separator 30, and the inner space of the case 50 may also be filled therewith. This electrolytic solution is not particularly limited, and may be an electrolytic solution (aqueous electrolytic solution, electrolytic solution using an organic solvent) used for electrical double layer capacitors known in the art. However, aqueous electrolytic solutions have a low electrochemical decomposition voltage and the withstand voltage of the capacitor is thereby limited, so electrolytic solutions using an organic solvent (nonaqueous electrolytic solutions) are preferred.

The type of electrolytic solution is not particularly limited, but in general, it is selected considering the solubility and degree of dissociation, and the viscosity of the solution, and it is preferably an electrolytic solution having high conductivity and a high potential window (decomposition starting potential is high). Typical examples are solutions obtained by dissolving a quarternary ammonium salt such as tetraethylammonium tetrafluoroborate in an organic solvent such as propylene carbonate, diethylene carbonate or acetonitrile. In this case, it is necessary to strictly control the mixing water.

The electrolytic solution, in addition to a liquid, may be a gel electrolyte obtained by adding a gelling agent A solid electrolyte such as a solid polyelectrolyte may also be used instead of a liquid electrolyte.

In this embodiment, as shown in FIG. 3, the thickness T1 of the element 3 is set to 600 μm or less. The total of the thickness T2 of the anode 10 and the thickness T3 of the cathode 20 are set to 80% or less, but preferably 65% or less, of the thickness T1 of the element 3. Since the thickness of the element 3 is set to 600 μm or less, the electrical double layer capacitor 1 can be made much thinner. For the same reason, the element 3 bends easily. However, since the sum of the thickness T2 of the anode 10 and thickness T3 of the cathode 20 is set to 80% or less of the thickness of the element 3, the incidence of chips and cracks in the anode 10 and cathode 20 is suppressed. As a result, the electrical double layer capacitor 1 still maintains good electrical properties.

In particular, by setting the sum of the thickness T2 of the anode 10 and thickness T3 of the cathode 20 to 65% or less of the thickness T1 of element 3, the resistance in the thickness direction of the anode and cathode can be lowered, and the internal resistance of the whole device can be lowered.

Further, the sum of the thickness T2 of the anode 10 and thickness T3 of the cathode 20 is preferably set to 10% or more of the thickness of the element 3. If the sum of the thickness T2 of the anode 10 and thickness T3 of the cathode 20 is less than 10% of the thickness of the element 3, the anode 10 and cathode 20 are too thin, it becomes very difficult to manufacture a uniform active substance layer, and there is a risk that the electrical properties of the electrical double layer capacitor 1 will decline. By setting the sum of the thickness T2 of the anode 10 and thickness T3 of the cathode 20 to 10% or more of the thickness of the element 3, the electrical double layer capacitor 1 can better maintain good electrical properties.

The case 50 is a film 52 (for example, a composite packaging film) which has flexibility, and is formed from a film having a thickness of 150 μm or less. The case 50 is manufactured by folding the film 52 by approximately ½ and heat sealing the edges of the folded inner surfaces. The element 3 and electrolytic solution 5 (part of which is contained in the anode 10, cathode 20 and separator 30) are accommodated inside the case 50 (space formed by a partial region where the film 52 is not heat-sealed).

A metal lead 60 is connected to the anode 10, one end of which is electrically connected to the anode 10 and the other end projects outside the case 50. A metal lead 62 is connected to the cathode 20, one end of which is electrically connected to the cathode 20 and the other end projects outside the case 50. In addition to the metal leads 60, 62, part of the anode charge collector and cathode charge collector may also be made to project outside the case 50.

Next, an example of a method of manufacturing the aforesaid electrical double layer capacitor 1 will be described The method of manufacturing the element 3 is not particularly limited, and thin film manufacturing techniques used to manufacture the electrical double layer capacitor 1 known in the art, can be used.

A porous layer-forming coating solution is prepared by mixing the constituent material for forming the porous layers of the anode 10 and cathode 20 comprising a carbon material such as activated carbon which has received activation treatment, with an electrically conducting agent (e.g., carbon black) for imparting electrical conductivity and a binder (PTFE or the like), in a solvent in which the aforesaid binder can be dissolved or dispersed. The aforesaid solvent may be NMP (N-methylpyrolidone), MIBK (methyl isobutylketone) or the like.

Next, the porous body layer-forming coating solution is applied to the anode charge collector 12, and dried to form the anode 10. After drying, the anode charge collector 12 and the anode 10 may be pressed together using a roller. The cathode 20 is formed on the cathode charge collector 14 by an identical procedure.

Next, the separator 30 is disposed between the anode 10 formed on the anode charge collector 12 and the cathode 20 formed on cathode charge collector 14 so that it is in contact therewith (non-adhesion state), to form a laminate. The laminate is formed by laminating the anode charge collector 12, anode 10, separator 30, cathode 20 and cathode charge collector 14 in this order.

Here, in the aforesaid laminate, if the electrodes (porous layer) which form the anode 10 and cathode 20 are carbon electrodes (polarizable electrodes), sheet-like electrodes (anode 10 and cathode 20) can for example also be manufactured using the carbon material, such as activated carbon which has received activation treatment, by the method known in the art. In this case, for example, after grinding the carbon material to about 5-100 μm to adjust the particle size, it is for example kneaded together with the electrically conducting agent (carbon black) for imparting electrical conductivity to the carbon powder and the binder (PTFE), and the kneaded material is rolled out to form a sheet Next, the element 3 is finished by performing the following heat and pressurizing treatment on the laminate formed as described above. This heat and pressurizing treatment can be performed by a means (hot press) normally used to perform heat and pressurizing treatment.

First, the aforesaid laminate is disposed between a pair of plate-like metal molds which are heating members. The surface (surface to be heated) of each metal mold which comes in contact with the laminate is set larger than the size of the laminate.

Next, the laminate is gripped by the pair of metal molds, and heat and pressurizing treatment is performed by heating the laminate while it is under pressure. Here, the temperature of the heat treatment is preferably a temperature at which the separator does not soften, for example, 150-250° C. Also, the pressure is preferably 20-100 kg/cm$^2$. The element 3, which is a laminate of the anode charge collector 12, anode 10, separator 30, cathode 20 and cathode charge collector 14 in a one-piece construction, is thereby obtained.

Next, the element 3 is sealed inside the case 50 by the following procedure.

First, the film 52 is prepared. If the film 52 is formed from the composite packaging film described previously, a known manufacturing method such as dry lamination, wet lamination, hot melt lamination or extrusion lamination may be used. For example, a film which is a layer of synthetic resin forming the composite packaging film, and a metal foil of aluminum or the like, are prepared. The metal foil can be prepared by for example rolling a metal material. Next, the composite packaging film (multi-layer film) is manufactured preferably by sticking the metal foil onto the layer of synthetic resin via an adhesive so as to form the plural layers described previously. The composite packaging film is then cut to a predetermined size to obtain a single sheet of the rectangular film 52.

Next, the sheet of film 52 is bent, and the element 3 is disposed therein.

Next, among the contact parts of the film 52 which are to be heat-sealed, heat sealing is performed on the parts between the edge parts of the film 52 where the leads 60, 62 are to be provided. Here, from the viewpoint of better ensuring superior seal properties of the case 50, the surface of the lead 60 used for the anode is first coated with the adhesive described earlier. After heat-sealing, an adhesive layer comprising the adhesive which contributes to seal properties is thereby formed between the lead 60 used for the anode and the film 52. Next, by performing heat-sealing of the parts surrounding the lead 62 used for the cathode at the same time as or separately from the aforesaid heat-sealing process by an identical procedure to that described above, the case 50 is formed with an excellent seal.

Next, among the edge parts (seal parts) of the film 52, the parts other than the parts surrounding the lead 60 used for the anode and the lead 62 used for the cathode are heat-sealed to a predetermined seal width under predetermined heating conditions using for example a sealing machine. At this time, in order to leave an opening part for injecting the electrolytic solution 5, a part is left which is not heat-sealed. The case 50 having an opening part is thereby obtained.

The electrolytic solution 5 is then poured in from the opening part described above. Next, the opening part of the case 50 is sealed using a vacuum sealing machine. This completes the manufacture of the case 50 and the electrical double layer capacitor 1.

As mentioned above, although a preferred embodiment of the invention was described in detail, the invention is not limited to the aforesaid embodiment. For example, in the aforesaid embodiment, the case was described where the element 3 includes the anode charge collector 12 and cathode charge collector 14, but the element 3 may be formed from the anode 10, cathode 20 and separator 30 excluding the charge collector.

Figure 4:
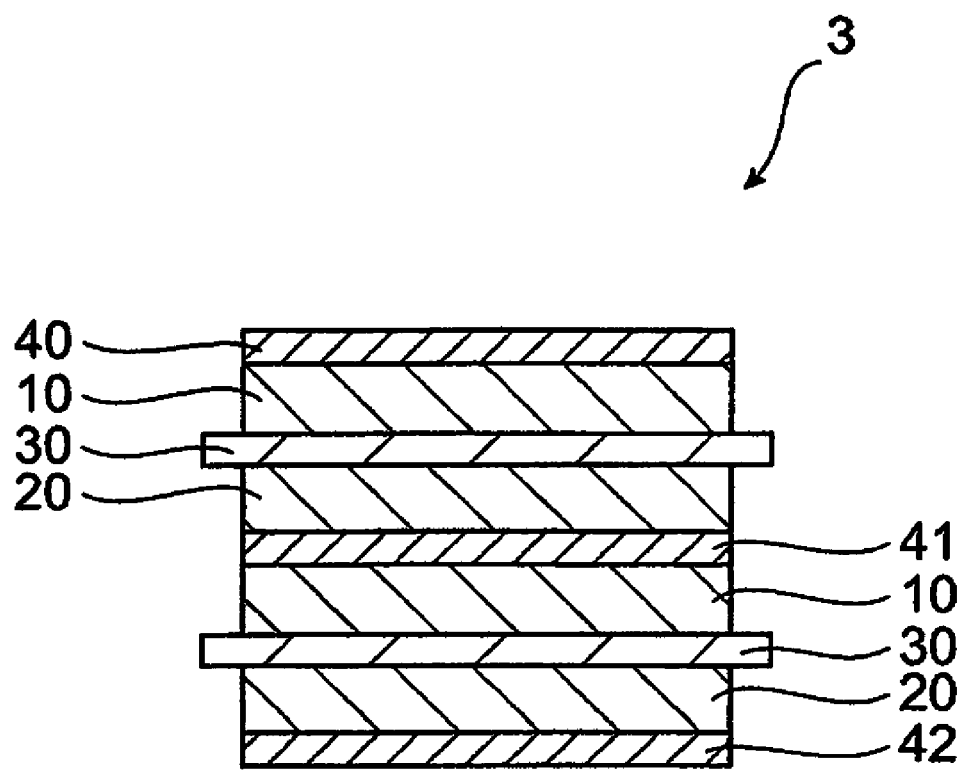
FIG. 4 is a schematic diagram showing the cross-sectional structure of the element in the electrical double layer capacitor according to this example.

The element 3 may also be formed from a laminate of unit structures wherein the separators 30 are sandwiched between the anode 10 and cathode 20 via charge collectors 40, 41, 42, as shown in FIG. 4.

In the aforesaid embodiment, the case where the electrochemical device was an electrical double layer capacitor was described, but the electrochemical device of this invention is not limited to an electrical double layer capacitor, and may be an electrochemical capacitor such as an aluminum electrolytic capacitor, a pseudocapacity capacitor or a redox capacitor, and a secondary cell such as a lithium ion secondary cell or a primary cell. The electrochemical device module of this invention may comprise these cells connected in parallel or in series.

EXAMPLES

Hereafter, the invention will be more specifically described based on examples and comparative examples, but the invention is not limited to the following examples.

Example 1

(1) Manufacture of Element

An anode and a cathode were manufactured by the following procedures. First, a coating solution for forming electrodes (hereafter, "coating solution EM") was prepared by blending an activated carbon material (activated carbon) which had received activation treatment, a thermoplastic resin (PVDF) used as binder and an electrically conducting agent (carbon black) so that their mass ratios were carbon material:electrically conducting agent:binder=8:1:1, and mixing with NMP which is a solvent The average particle diameter of the activated carbon was about 5 µm. The average particle diameter of the carbon black was about 40 nm.

Next, this coating solution EM was uniformly applied to one side of a charge collector comprising aluminum foil. The thickness of the charge collector was 20 µm. Next, a laminate was formed by removing the NMP from the coating film by drying, and after drying, pressing the charge collector and coating film together by a roller so as to form an electronically conducting porous layer (thickness: 25 µm) on one side of the charge collector comprising aluminum foil. The thickness of the porous layer was 25 µm. This porous layer was used as the anode or cathode. When the coating solution EM was applied to the aluminum foil, a part to which the coating solution EM was not applied was left at the edge of the aluminum foil.

Next, two rectangles (7.6 mm×7.6 mm) were manufactured by punching out this laminate by a mold, a rectangular separator (7.8 mm×7.8 mm) comprising a recycled cellulose nonwoven fabric was sandwiched between these two laminates, and the two laminates and separator were then bonded by thermo-compression using the means to perform heat and pressurizing treatment mentioned above. The thickness of the separator was 17 µm. The heat treatment temperature was 230° C., the pressure was 90 kg/cm², and the processing time was 40 seconds. In this way, an element was manufactured comprising the anode charge collector, anode, separator, cathode and cathode charge collector laminated in this order. A lead part (width 3 mm, length 8 mm, thickness 2.0 µm) to which the coating solution EM was not applied, was integrated with the anode and cathode.

The thickness of the obtained element was 147 µm The sum of the anode thickness and cathode thickness was 50 µm. Therefore, the sum (%) of the anode thickness and cathode thickness relative to the thickness of the element was 46.7 (=50/107×100).

(2) Manufacture of Electrical Double Layer Capacitor

A laminate (thickness: 100 µm, size 24.0 mm×15.0 mm) was prepared comprising an innermost layer of synthetic resin (layer of denatured polypropylene, thickness 40 µm)) which comes in contact with the electrolytic solution, a metal layer (thickness: 40 µm) of aluminum foil and a layer (thickness: 20 µm) of polyamide as a flexible, composite packaging film.

Next, the long side of the composite packaging film was bent back by about ½, and the element 3 was disposed therein. At this time, the parts of the composite packaging film with which the anode lead and cathode lead come in contact, were covered by an acid-denatured polypropylene film (thickness: 30 µm) as an adhesive layer.

Next, heat sealing was performed around the anode lead and cathode lead. The heat sealing was performed by applying a pressure of 0.05 Pa to the edges of the composite packaging film at 185° C. for 10 seconds.

Next, among the seal parts of the composite packaging film, parts other than the part around the anode lead and the part around the cathode lead were heat-sealed. At this time, to leave an opening for introducing a nonaqueous electrolytic solution, a part which was not heat-sealed was provided.

Next, the nonaqueous electrolytic solution (1.2 mol/L propylene carbonate solution of triethylmethylammonium tetrafluoroborate) was poured into the case from the aforesaid opening part The aforesaid opening was then sealed using a vacuum heat-sealing machine. An electrical double layer capacitor was thereby manufactured. The dimensions of the electrical double layer capacitor were 12.0 mm×15.0 mm.

Example 2

An electrical double layer capacitor was manufactured as in Example 1, except the anode thickness and cathode thickness were 100 µm. The thickness of the electrical double layer capacitor was 657 µm. The thickness of the element was 257 µm The sum of the anode thickness and cathode thickness was 200 µm. Therefore, the sum of the anode thickness and cathode thickness (%) relative to the thickness of the element was 77.8 (=200/257×100).

Example 3

An electrical double layer capacitor was manufactured as in Example 1, except the anode thickness and cathode thickness were 5 µm. The thickness of the electrical double layer capacitor was 145 µm. The thickness of the element was 75 µm The sum of the anode thickness and cathode thickness was 10 µm. Therefore, the sum of the anode thickness and cathode thickness (%) relative to the thickness of the element was 14.9 (=10/67×100).

Example 4

An electrical double layer capacitor was manufactured as in Example 1, except the anode charge collector thickness and the cathode charge collector thickness were 15 µm, and the anode thickness and cathode thickness were 25 µm. The thickness of the electrical double layer capacitor was 297 µm. The thickness of the element was 97 µm. The sum of the anode thickness and cathode thickness was 50 µm. Therefore, the sum of the anode thickness and cathode thickness (%) relative to the thickness of the element was 51.5 (=50/97×100).

Example 5

An electrical double layer capacitor was manufactured as in Example 1, except the anode charge collector thickness and cathode charge collector thickness were 15 µm, and the anode thickness and cathode thickness were 80 µm. The thickness of the electrical double layer capacitor was 407 µm. The thickness of the element was 207 µm. The sum of the anode thickness and cathode thickness was 160 µm. Therefore, the sum of the anode thickness and cathode thickness (%) relative to the thickness of the element was 77.3 (=160/207×100).

Comparative Example 1

An electrical double layer capacitor was manufactured as in Example 1, except the anode thickness and cathode thickness were 150 μm. The thickness of the electrical double layer capacitor was 557 μm. The thickness of the element was 357 μL The sum of the anode thickness and the cathode thickness was 300 μm. Therefore, the sum of the anode thickness and the cathode thickness (%) relative to the thickness of the element was 84.0 (=300/357×100).

Comparative Example 2

An electrical double layer capacitor was manufactured as in Example 1, except the anode thickness and cathode thickness were 200 μm. The thickness of the electrical double layer capacitor was 657 μm. The thickness of the element was 457 μm. The sum of the anode thickness and the cathode thickness was 400 μm. Therefore, the sum of the anode thickness and the cathode thickness (%) relative to the thickness of the element was 87.6 (=400/457×100).

Comparative Example 3

An electrical double layer capacitor was manufactured as in Example 1, except the anode thickness and cathode thickness were 3 μm. The thickness of the electrical double layer capacitor was 263 μm. The thickness of the element was 63 μm. The sum of the anode thickness and the cathode thickness was 6 μm. Therefore, the sum of the anode thickness and the cathode thickness (%) relative to the thickness of the element was 9.5 (=6/63×100).

Characteristic Evaluation Tests of Electrochemical Device

Five electrical double layer capacitors of Examples 1-5 and Comparative Examples 1-3 were manufactured, respectively, and the capacity of the electrical double layer capacitor was measured before and after a bending test for each of the 5 electrical double layer capacitors (Nos. 1-5).

The capacity of the electrical double layer capacitor was measured as follows.

A constant-potential charge was performed at a rated voltage (2.7V) at 25° C. for 1 hour, using a charge/discharge tester. The final voltage was 0V, and a constant-current discharge of 0.5 mA was performed. The total discharge energy [W/s] was calculated as the time integral of discharge voltage×current from the discharge curve at this time (discharge voltage-discharge time, and the capacity [F] of the electrical double layer capacitor module was calculated using the relation [F]=2×total discharge energy [W/s]/(starting voltage [V])$^2$.

A bending test was carried out as follows.

Figure 5:
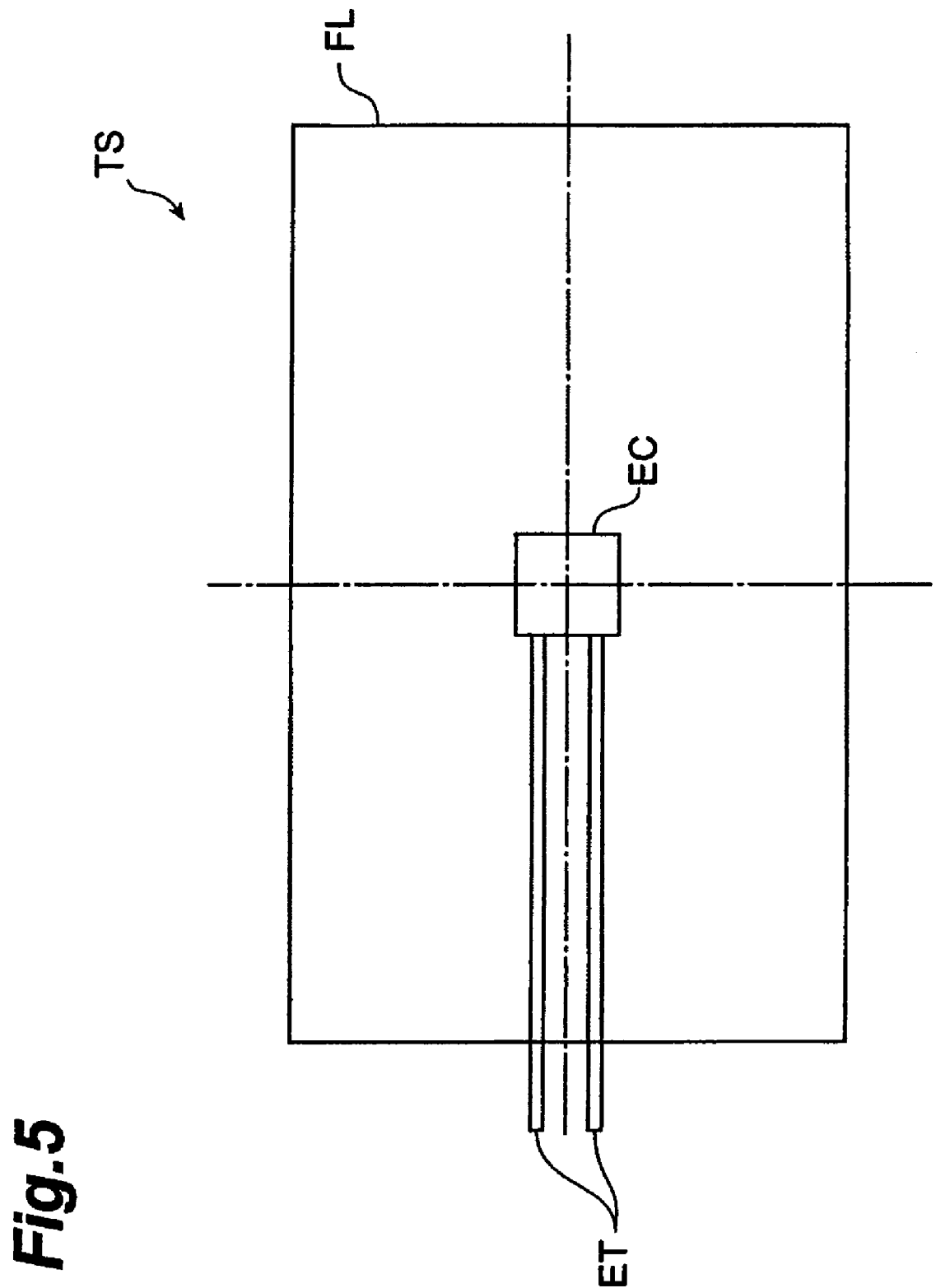
FIG. 5 is a schematic diagram showing the construction of a test specimen.

First, a test specimen TS was manufactured respectively for the electrical double layer capacitors Nos. 1-5 of Examples 1-5 and Comparative Examples 1-3 (see FIG. 5). The test specimen TS was manufactured by the following procedure.

Two PET films FL comprising a double-stick tape on the whole of one side, were prepared. An electrical double layer capacitor EC was inserted between the two PET films FL, and the two PET films FL were stuck together using a roller. The test specimen TS shown in FIG. 5 was thereby produced. The electrical double layer capacitor EC was situated in the center of the PET film FL. The two PET films FL had a rectangular shape (85 mm×54 mm), and their thickness was 200 μm. A pair of terminals ET having one end extending outside the PET film FL, were connected to the electrical double layer capacitor EC. The other end of one of the terminals ET was electrically connected to the lead 60 of the electrical double layer capacitor EC, and the other end of the other terminal ET was electrically connected to the lead 62 of the electrical double layer capacitor EC.

Next, as shown in (a) of FIG. 6, one end in the length direction of the test specimen TS was fixed in a clamp CL. The distance D1 in the length direction of the part of the test specimen TS fixed in the clamp CL was 36.5 mm. This test specimen TS, of which one end was fixed to the clamp CL, was then twisted a predetermined number of times (250 times) so that the other end of the test specimen TS displaced by a predetermined distance D2 (=20 mm).

Next, as shown in (b) of FIG. 6, one end in the width direction of the test specimen TS was fixed in the clamp CL. The distance D3 in the width direction of the part of the test specimen TS fixed in the clamp CL was 16.5 mm. This test specimen TS, of which one end was fixed to the clamp CL, was then twisted a predetermined number of times (250 times) so that the other end of the test specimen TS displaced by a predetermined distance D4 (=10 mm).

The measurement capacity of the electrical double layer capacitors of Nos. 1-5 of Examples 1-5 and Comparative Examples 1-3 before and after bending, is shown in FIG. 7.

For the electrical double layer capacitor Nos. 1-5 of Examples 1-5, the capacity is not much different before and after the bending test. On the other hand, for the electrical double layer capacitors No. 2, No. 5 of Comparative Example 1, and Nos. 1-4 of Comparative Example 2, charge could not be performed. For the electrical double layer capacitors No. 3 of Comparative Example 1, and No. 5 of Comparative Example 2, the capacity after the bending test decreased remarkably compared to the capacity before the bending test In Comparative Example 3, the coating solution could not be uniformly applied when the anode and cathode were manufactured, the capacity decreased sharply relative to coating film thickness, and was not suitable for practical use.

The electrical double layer capacitor of each test specimen was disassembled after the bending test, and the state of the element was checked visually. As a result, for the electrical double layer capacitors Nos. 1-5 of Examples 1-5, and the electrical double layer capacitors No. 1-5 of Comparative Examples 3, no change at all in the element was observed. On the other hand, for Nos. 1-4 which could not be charged, No. 3 of Comparative Example 1 and No. 5 of Comparative Example 2, in which capacity decreased remarkably after the bending test, it was found that there were chips and cracks in the anode or cathode, and the anode and cathode were short-circuiting. Fragments of the anode or cathode were also found distributed in the electrolytic solution.

Next, the relation between the element thickness of the electrical double layer capacitor and the ease of bending of the electrical double layer capacitor concerned was verified in the following Examples 6-8 and Comparative Examples 4.

Example 6

An electrical double layer capacitor was manufactured as in Example 1, except the anode thickness and cathode thickness were 260 μm. The thickness of the electrical double layer capacitor was 777 μm. The thickness of the element was 577 μm

Example 7

An electrical double layer capacitor was manufactured as in Example 1, except the anode thickness and cathode thickness were 100 μm. The thickness of the electrical double layer capacitor was 457 μm. The thickness of the element was 257 μm.

Example 8

The electrical double layer capacitor was manufactured as in Example 1, except the anode thickness and thickness of cathode were 10 μm. The thickness of the electrical double layer capacitor was 277 μm. The thickness of the element was 77 μm.

Comparative Example 4

Figure 8:
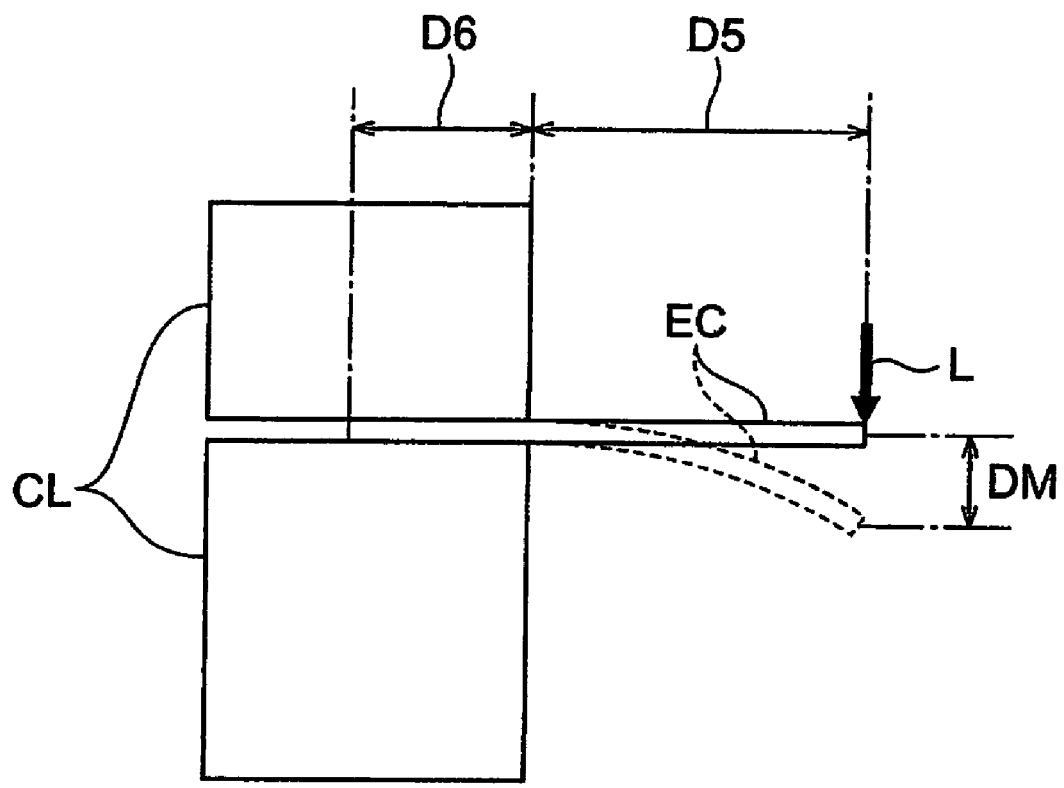
FIG. 8 is a schematic diagram for describing a bending test.

An electrical double layer capacitor was manufactured as in Example 1, except the anode thickness and cathode thickness were 350 μm. The thickness of the electrical double layer capacitor was 957 μm. The thickness of the element was 757 μm Here, the following bending test was carried out As shown in FIG. 8, the end of the electrical double layer capacitors EC of Examples 6-8 and Comparative Example 4 on the side where the leads were disposed, was fixed in the clamp CL. The deformation amount DM of the electrical double layer capacitor EC when a predetermined load L (=500 g) was applied to a position at a predetermined distance D5 (=7 mm) from the fixing position of the electrical double layer capacitor EC, was measured. The distance D6 of the part of the electrical double layer capacitors EC fixed in the clamp CL was 5 mm.

FIG. 9 shows the result of measuring the deformation amount of the electrical double layer capacitor. As shown in FIG. 9, the deformation amount of the electrical double layer capacitor of Examples 6-8 is 1.0 mm or more, and it was found that an electrical double layer capacitor having an element thickness of 600 μm or less bends easily. On the other hand, the deformation amount of the electrical double layer capacitor of Comparative Example 4 was less than 0.5 mm, and it was found that an electrical double layer capacitor having an element thickness greater than 600 μm, does not bend easily.

From the above, it was found that the electrochemical device of this invention could be made thinner while maintaining good electrical properties.

What is claimed is:

1. An electrochemical device comprising:
an element comprising first and second electrodes, and a separator separating said first and second electrodes, wherein said first and second electrodes comprise an electrically conducting active substance layer containing an electrically conducting substance as a constituent material, and an electrically conducting charge collector assembly disposed in electrical contact with said active substance layer, wherein:
the thickness of said element is set to 600 μm or less, and the total thickness of said active substance layer contained in said first and second electrodes is set to 80% or less of the thickness of said element.

2. An electrochemical device according to claim 1, wherein the total thickness of said active substance layers in said first and second electrodes, is set to 10% or more of the thickness of said element.

3. An electrochemical device according to claim 1, wherein the sum of the thickness of said first electrode and thickness of said second electrode is set to 10% or more of the thickness of said element.

4. An electrochemical device according to claim 1, wherein the total thickness of said active substance layer contained in said first and second electrodes is set to 65% or less of the thickness of said element.

5. An electrochemical device according to claim 1, wherein the lateral ends of said charge collector assembly of said first electrode, said active substance layer of said first electrode, said active substance layer of said second electrode and said charge collector assembly of said second electrode, respectively, are formed so that they are aligned with each other in the same vertical planes.

6. An electrochemical device according to claim 5, wherein the lateral ends of said separator project outside further than said same vertical planes.

7. An electrochemical device according to claim 1, wherein said active substance layer of said first electrode and said active substance layer of said second electrode consist of porous layers containing electrically conducting porous particles as a constituent material and wherein said separator is formed from an insulating porous material.

8. An electrochemical device according to claim 7, wherein a liquid electrolyte is contained in said active substance layer of said first electrode, said active substance layer of said second electrode and said separator.

* * * * *